United States Patent [19]

Sandri et al.

[11] Patent Number: 5,493,587
[45] Date of Patent: Feb. 20, 1996

[54] METHOD AND CIRCUITS FOR REDUCING THE PEAK POWER OF THE FILTERED SIGNAL TRANSMITTED IN A DIGITAL LINK

[75] Inventors: Andrea Sandri, Monza; Arnaldo Spalvieri, Milan, both of Italy

[73] Assignee: Alcatel Italia S.p.A., Milan, Italy

[21] Appl. No.: 97,675

[22] Filed: Jul. 27, 1993

[30] Foreign Application Priority Data

Jul. 27, 1992 [IT] Italy ................... MI92A1819

[51] Int. Cl.⁶ ................... H04B 15/00
[52] U.S. Cl. ................... 375/285; 375/350; 375/261; 371/44; 329/304
[58] Field of Search ................... 375/39, 58, 261, 375/262, 263, 349, 264, 350, 285, 340, 346; 371/43, 44, 45; 329/304, 306

[56] References Cited

U.S. PATENT DOCUMENTS 4,959,842  9/1990  Forney et al. ................... 375/39
5,159,610  10/1992  Eyuboglu et al. ................... 371/43 X
5,162,812  11/1992  Aman et al. ................... 375/39 X

OTHER PUBLICATIONS

"Analysis of Predistortion, Equalization, and ISI Cancellation Techniques in Digital Radio Systems with nonlinear Transmit Amplifiers", G. Karam et al, *IEEE Transactions on Communications*, vol. 37, No. 12, Dec. 1989, pp. 1245–1253.

G. David Forney, Jr., "Trellis Shaping", IEEE Transactions on Information Theory vol. 38. No. 2, Mar. 1992 pp. 281–300.

*Primary Examiner*—Stephen Chin
*Assistant Examiner*—Bryan E. Webster
*Attorney, Agent, or Firm*—Ware, Fressola, Van Der Sluys & Adolphson

[57] ABSTRACT

The invention relates to a method of reducing the peak power of a signal at the output of the transmit filter of a digital link, e.g. a microwave link. The invention is characterized by the use of a coding in transmission and a decoding in reception, adapted to reduce the peak power of the filtered signal. In the disclosed embodiment, not intended to be limiting, the encoder and the decoder can be realized through simple maps insertable in the baseband part of the system.

14 Claims, 1 Drawing Sheet

METHOD AND CIRCUITS FOR REDUCING THE PEAK POWER OF THE FILTERED SIGNAL TRANSMITTED IN A DIGITAL LINK

TECHNICAL FIELD

The present invention relates to a method of reducing the peak power of a signal at an output of a transmit filter of a digital link, e.g., a microwave one. Such reduction allows minimization of the effects of nonlinearities in the transmit channel, including nonlinearities of a transmit amplifier.

BACKGROUND OF THE INVENTION

Present digital transmission systems try to obtain high spectral efficiencies through gradually more complex modulation formats. The higher spectral efficiency is counterbalanced by the need to increase the transmitted power to obtain a prefixed BER (Bit Error Rate: number of wrong bits to total number of bits ratio) value at the receiver. The power delivered by the transmitter generally is limited by the final power amplifier, which has a greatly nonlinear behaviour. Therefore a serious problem arises with regard to the best exploitation of the nonlinear part of the input-output characteristic of the "channel", including in the latter the final amplifier of the transmitter. At present the problem is faced in one of the following ways (see, e.g., the papers of G. Karam, H. Sari, "Analysis of predistortion, equalization and ISI cancellation techniques in digital radio systems with nonlinear transmit amplifier", IEEE Transaction on Communications, vol. 37, n. 12, Dec. 1989):

1) data predistortion: one tries to modify the constellation used for driving the nonlinear amplifier through a signal such as to obtain the desired constellation at its output;

2) analog signal predistortion: a nonlinear circuit having a characteristic opposite to the one of the above-defined "channel", is inserted in the path of the analog signal;

3) channel equalization and nonlinear cancellation of the ISI: the receive equalizer tries to cancel the interferences connected with nonlinearity from the present signal sample (through a suitable nonlinear combination of pre- and post-cursors);

4) use of "circular" constellations so as to reduce the ratio between the peak power and the average power of the not-filtered signal.

All the above solutions, under special circumstances, can provide unsatisfactory features. In particular the first three are not particularly efficient in the presence of a hard limiter characteristic of the transmitter final amplifier; this last gives rise to gains which are in any event slight and which cannot be sufficient in the case of a reception filter with a very narrow band.

DISCLOSURE OF INVENTION

It is an object of the invention to individuate a base-band system which—at parity of other conditions—reduces the peak power of the filtered signal, i.e., at the input of the nonlinear channel defined above. It has been found, inter alia, that such reduction is to the advantage of radio relay system links, e.g., allowing the use of smaller antennas or the transmission over longer path sections.

According to the present invention, coding in transmission and decoding in reception, adapted to reduce the peak power of the filtered signal is provided; in the disclosed embodiment, an encoder and decoder can be realized through simple maps insertable in the baseband part of the system.

In further accord with the present invention, a method of transmitting and receiving numerical signals comprising the steps of modulating, in a transmit channel, a numeric sequence, filtering and transmitting the filtered signal through the transmit channel which is a nonlinear channel, and in which in a receive channel the filtered signal is subjected to filtering and demodulating in order to reconstruct the transmitted numeric sequence, according to the present invention further comprising the steps of, in the transmit channel, eliminating unwanted sequences in terms of peak power of the filtered signal to eliminate such from the modulated signal before filtering and replacing the eliminated sequences with selected sequences, and, in the receive channel, restoring the received and filtered signal to its original form, i.e., containing the unwanted sequences suppressed in transmission, and sending the restored signal to a demodulator.

In still further accord with the present invention, the transmit and receive channels may comprise a digital, radio relay system and may use quadrature amplitude modulation and wherein the step of replacing the sequences is carried out through a baseband digital encoder. A "recurring" code, i.e., using previously-transmitted symbols for individuating a symbol to be transmitted may be used. The individuation of the sequences for replacement may be carried out on the basis of an equation to be disclosed below.

According still further to the present invention, a system for transmitting and receiving numerical signals comprising in a transmission channel, a data source, an encoder/modulator, a transmit filter and a nonlinear amplifier and, in a reception channel, a receive filter and a decoder/demodulator, according to the present invention further comprising, in the transmission channel, an encoder for reducing a peak power of a filtered signal, wherein the encoder is inserted upstream of the transmit filter, and wherein in the reception channel, a decoder for reducing a peak power of the filtered signal, wherein the decoder is inserted downstream of the receive filter. The decoder may be of the "recurrent" type. The encoder may comprise at least a map and a multiplexer; such a map may generate the sequences to be transmitted on the basis of the equation disclosed below.

The basic idea of the invention is based upon the possibility (other conditions such as minimum distance between transmitted points, average transmitted power, etc., being equal) of avoiding transmission of sequences which are associated with a high peak power of the filtered signal, replacing them with more suitable sequences (i.e., with a lower peak power of the filtered signal). The possibility of carrying out this replacement is given by increasing of the dimension of the alphabet of the transmitted points. In the reception process, the unwanted sequences, suppressed in transmission, are reconstituted in their original form. By reducing in this way the peak power of the filtered signal it is possible to exploit in a much more efficient manner the nonlinear characteristic of the above-defined "channel".

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
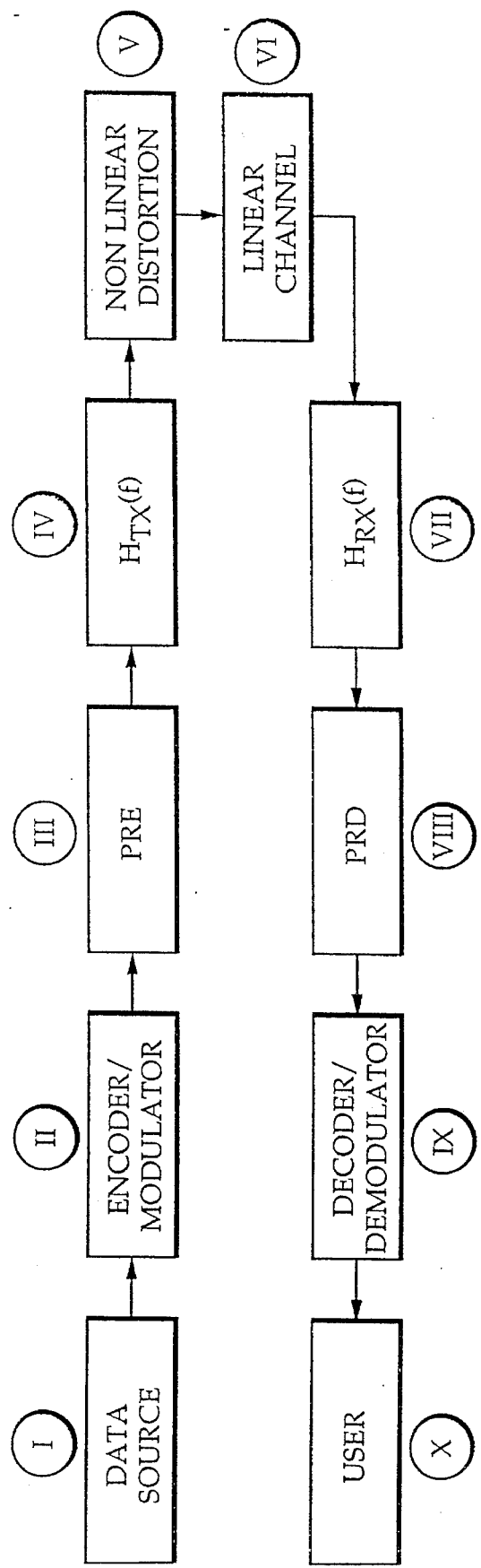
FIG. 1 illustrates a block diagram of a digital transmission system in which the present invention is embodied.

FIG. 1 illustrates the schematic block diagram of a generic digital transmission system (blocks I, II, IV, V, VI, VII, IX, X) in which blocks II and VIII, subject of this invention, are inserted. In particular, FIG. 1 shows:

- a DATA SOURCE (ref. I) which provides the numeric sequence to be transmitted at its output;
- an ENCODER/MODULATOR block (ref. II) which receives at the input the numeric sequence to be transmitted and carries out the standard encoding operations designed for BER reduction (block, convolutional, Trellis Code Modulation, etc., type encoding) and modulation operations, providing at its output one of the points of the constellation to be transmitted;
- a PRE block (ref. III), subject of the invention along with block VIII, which eliminates from the transmission the unwanted sequences in terms of peak power of the filtered signal, i.e. of the signal at the output of block IV described below;
- the transmission filter HTx(f) (ref. IV) which provides at its output the analog signal to be transmitted;
- a NONLINEAR DISTORTION block (ref. V) representing an unwanted nonlinear distortion on the signal path. Such can be due to the nonlinear characteristic of the final amplifier of the transmitter (as it happens, e.g., in microwave links) or, for the more general case, to a nonlinear behaviour of the information channel;
- the information channel proper (ref. VI) identified as "LINEAR CHANNEL", which outputs a signal constituted by the signal at its input added to and/or combined with disturbances of various kinds;
- the reception filter HRx(f) (ref. VII) which receives the signal from the transmit channel and carries out suitable filtering;
- a PRD block (ref. VIII), subject of the invention along with block III, which reconstitutes the signal in its original form containing the unwanted sequences suppressed in transmission by block III;
- a DECODER/DEMODULATOR block (ref. IX) which receives the outgoing signal from block VIII, demodulates it and carries out the above-mentioned standard decoding operations, providing the user with the numeric sequence subject of the transmission;
- the USER (ref. X) which receives the numeric sequence.

Figure 2:
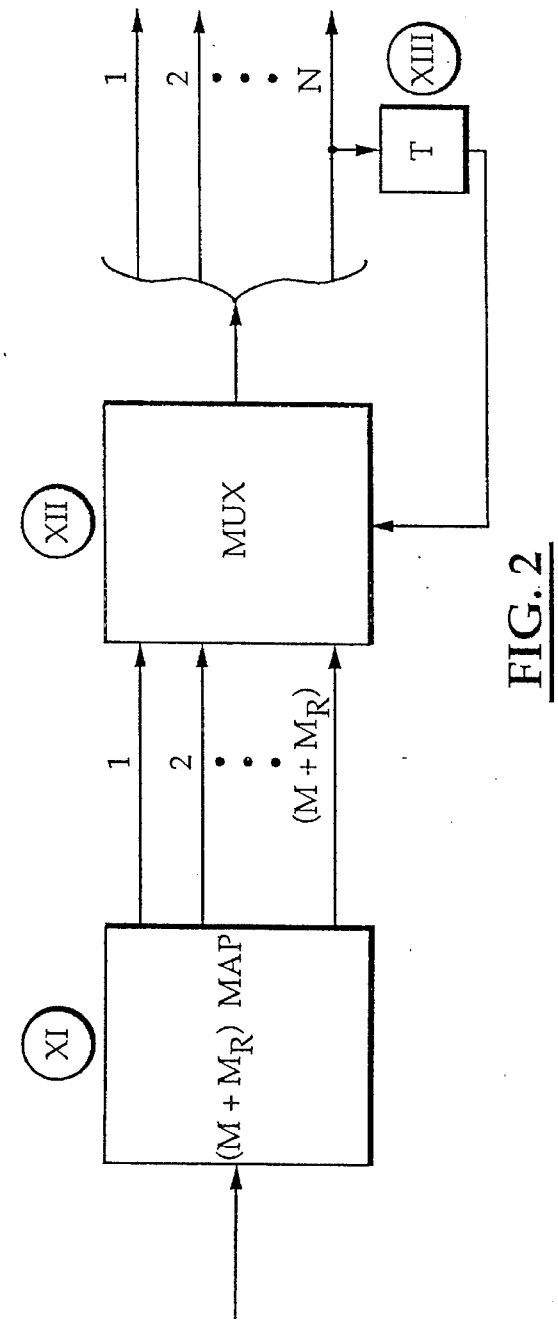
FIG. 2 shows an embodiment of the PRE block of FIG. 1.

In an advantageous embodiment, blocks PRE (III) and PRD (VIII) in accordance with the invention are realized in the form of digital encoders. As an example, FIG. 2 shows a block diagram illustrating how it is possible to realize the PRE in case of a radio relay system transmission using quadrature amplitude modulation (QAM). Let M be the points of the two-dimensional constellation to be transmitted in the conventional case (hereinafter "standard" constellation) and MR be the redundance points necessary for the encoding (carried out in PRE) subject of the invention; the resulting constellation is composed of (M+MR) points (hereinafter "expanded" constellation).
Typically: 1<(M+MR)/M<1.2.
In FIG. 2 there is shown an embodiment of PRE; it includes:

A delay element T (ref. XIII) which receives as its input the last two-dimensional element of the block of N outgoing two-dimensional symbols from XII and outputs it with a delay equal to one channel symbol interval. Such output will be indicated as "state" of the machine in the following.

A map identified as "(M+MR) MAP" (ref. XI) which receives at its input a block of N symbols of the "standard" constellation and provides (M+MR) blocks of N two-dimensional symbols of the "expanded" constellation. Each output block is relative to a particular "state" of the system and represents the best sequence to be transmitted (in the presence of that particular "state" of the machine) in terms of peak power of the filtered signal.

A multiplexer "MUX" (ref. XII) having (M+MR) inputs and one output which, on the basis of the "state" at the output of block XIII selects (among the M+MR present at its input) the suitable block of N symbols to be provided at the output.

It remains to be defined as to what is the meaning of "best sequence in terms of peak power of the filtered signal". According to one particular aspect—not in a limiting sense—of the invention, the calculation is arranged as follows. Let HTx(t) be the impulse response of the transmission filter IV of FIG. 1, T the symbol time, $d^{(k)}$ (k=1, 2, ..., (M+MR)) the "state" of the system, Ci=(ci, ci+1, ..., cN−1) the generic block of N two-dimensional symbols, the "weight" w of block Ci=(ci, ci+1, ..., cN−1) given the state d(k), can be defined as the quantity:

$$w(d^{(k)}, Ci) = \max_{-NT \leq t < NT} \left| HTx(to - T) d^{(k)} + \sum_{j=0}^{N-1} HTx(to + JT) cj \right|^2 \quad (1)$$

then meaning that the best sequences Ci (in terms of peak power of the filtered signal) are those having a lower "weight" $w(d^{(k)}, Ci)$.

The PRD can be realized through a circuit quite similar to the one shown in FIG. 2 for PRE; its description in terms of block diagram (being within the reach of those skilled in the art, in the light of what has been set forth hereinbefore) will be omitted for the sake of conciseness.

Reference has been made to specific embodiments represented in FIGS. 1 and 2 with simplicity and conciseness for clarity of illustration; therefore it is evident that these are susceptible to those variations, modifications, replacements and the like which, being within the reach of those skilled in the art, naturally fall within the sphere and the spirit of the scope of the invention.

The following possible variants are here mentioned by way of an example:

- in equation (1) a "state" constituted by several two-dimensional symbols could be envisaged;
- blocks XI and XII of FIG. 2 could be replaced by a combinatory algebra, thus transforming the structure of PRE into a convolutional one.
- N could be taken great enough to be able to eliminate in FIG. 2 the reaction through block XIII thus transforming the structure of PRE into a "block" structure.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method for transmitting and receiving numerical signals, comprising the steps of:

for transmission in a transmit channel;
  modulating data in a numeric sequence from a numeric or numerized source, thereby providing a modulated signal;
  filtering the modulated signal; and
  transmitting the filtered signal through the transmit channel which is a nonlinear channel where the nonlinearity may be due to a nonlinear characteristic of a final amplifier of a transmitter, or more generally to a nonlinear behaviour of the transmit channel,
for reception of the filtered signal as a received signal in a receive channel;
  filtering the received signal, and
  demodulating the filtered received signal in order to reconstruct the transmitted numeric sequence, wherein
for the transmission, prior to said step of filtering;
  identifying numeric sequences having a high peak power in terms of peak power of the filtered modulated signal, and
  replacing said numeric sequences having a high peak power in terms of peak power of the filtered modulated signal with suitable numeric sequences having a lower peak power in terms of peak power of the filtered modulated signal, thereby suppressing said numeric sequences having a high peak power in terms of peak power of the filtered modulated signal, and
for the reception, prior to said step of demodulating;
  restoring the modulated signal from the received filtered signal by restoring the suppressed numeric sequences having a high peak power in terms of peak power of the filtered modulated signal, and
  sending the restored received filtered signal to a demodulator for performing said step of demodulating.

2. A method according to claim 1, wherein the transmit and receive channels comprise a digital, radio relay system and use quadrature amplitude modulation (QAM), and wherein the step of replacing said numeric sequences is carried out through a base-band digital encoder.

3. A method according to claim 2, wherein a "recurring" coding, i.e., using previously-transmitted symbols for individuating a symbol to be transmitted, is used by the base-band encoder for the step of replacing said numeric sequences.

4. A method according to claim 3, wherein the individuation of the numeric sequences for replacement is carried out on the basis of the following equation:

$$w(d^{(k)}, Ci) = \max_{-NT \leq t < NT} \left| HTx(to-T)d^{(k)} + \sum_{j=0}^{N-1} HTx(to+J)cj \right|^2$$

5. A system for implementing a method of transmitting and receiving numerical signals, comprising:
  a transmission channel, including:
    a data source for providing data,
    an encoder/modulator for modulating said data in a numeric sequence thereby providing a modulated signal,
    a transmit filter for filtering the modulated signal, and
    a nonlinear amplifier for amplifying the filtered modulated signal; and
  a reception channel, including:
    a receive filter for filtering the received amplified filtered modulated signal, thereby providing a received filtered signal; and
    a decoder/demodulator for demodulating the received filtered signal, wherein the transmit channel further comprises an encoder including:
  means responsive to said modulated signal for identifying numeric sequences having a high peak power in terms of peak power of the filtered modulated signal; and
  means for replacing said numeric sequences having a high peak power in terms of peak power of the filtered modulated signal with suitable numeric sequences having a lower peak power in terms of peak power of the filtered modulated signal, thereby suppressing said numeric sequences having a high peak power in terms of peak power of the filtered modulated signal; and
wherein the reception channel further comprises a decoder inserted downstream of the receive filter, the decoder including means for restoring the modulated signal from the received filtered signal by restoring the suppressed numeric sequences having a high peak power in terms of peak power of the filtered modulated signal.

6. A system according to claim 5, wherein the decoder is of "recurrent" type.

7. A system according to claim 6, wherein the encoder comprises at least a map and a multiplexer.

8. A system according to claim 7, wherein the map replaces said numeric sequences having a high peak power in terms of peak power of the filtered modulated signal with suitable numeric sequences having a lower peak power in terms of peak power of the filtered modulated signal on the basis of the following equation:

$$w(d^{(k)}, Ci) = \max_{-NT \leq t < NT} \left| HTx(to-T)d^{(k)} + \sum_{j=0}^{N-1} HTx(to+J)cj \right|^2$$

9. A method for transmitting and receiving numerical signals, comprising the steps of:
for transmission in a transmit channel:
  modulating data in a numeric sequence from a numeric or numerized source, thereby providing a modulated signal;
  filtering the modulated signal; and
  transmitting the filtered signal through the transmit channel which is a nonlinear channel where the nonlinearity may be due to a nonlinear characteristic of a final amplifier of a transmitter, or more generally to a nonlinear behaviour of the transmit channel,
for reception of the filtered signal as a received signal in a receive channel:
  filtering the received signal, and
  demodulating the filtered received signal in order to reconstruct the transmitted numeric sequence, wherein
for the transmission, prior to said step of filtering:
  identifying numeric sequences having a high peak power in terms of peak power of the filtered modulated signal, and
  replacing said numeric sequences having a high peak power in terms of peak power of the filtered modulated signal with suitable numeric sequences having a lower peak power in terms of peak power of the filtered modulated signal, thereby suppressing said numeric sequences having a high peak power in terms of peak power of the filtered modulated signal, wherein for the step of replacing said numeric sequences, previously-transmitted symbols are used for individuating a symbol to be transmitted, and wherein the individuation of the numeric sequences for replacement is carried out on the basis of the following equation:

$$w(d^{(k)}, Ci) = \max_{-NT \leq t < NT} \left| HTx(to - T)d^{(k)} + \sum_{j=0}^{N-1} HTx(to + J)cj \right|^2$$

for the reception, prior to said step of demodulating:
restoring the modulated signal from the received filtered signal by restoring the suppressed numeric sequences having a high peak power in terms of peak power of the filtered modulated signal, and
sending the restored received filtered signal to a demodulator for performing said step of demodulating.

10. A method according to claim 9, wherein
the transmit and receive channels comprise a digital, radio relay system and use quadrature amplitude modulation (QAM), and wherein
the step of replacing said numeric sequences is carried out through a base-band digital encoder.

11. A system for implementing a method of transmitting and receiving numerical signals, comprising:
a transmission channel, including:
a data source for providing data,
an encoder/modulator for modulating said data in a numeric sequence thereby providing a modulated signal,
a transmit filter for filtering the modulated signal, and
a nonlinear amplifier for amplifying the filtered modulated signal; and
a reception channel, including:
a receive filter for filtering the received amplified filtered modulated signal, thereby providing a received filtered signal; and
a decoder/demodulator for demodulating the received filtered signal,
wherein the transmit channel further comprises an encoder including:

means responsive to said modulated signal for identifying numeric sequences having a high peak power in terms of peak power of the filtered modulated signal; and
means for replacing said numeric sequences having a high peak power in terms of peak power of the filtered modulated signal with suitable numeric sequences having a lower peak power in terms of peak power of the filtered modulated signal, thereby suppressing said numeric sequences having a high peak power in terms of peak power of the filtered modulated signal; and
wherein said numeric sequences having a high peak power in terms of peak power of the filtered modulated signal are replaced with suitable numeric sequences having a lower peak power in terms of peak power of the filtered modulated signal on the basis of the following equation:

$$w(d^{(k)}, Ci) = \max_{-NT \leq t < NT} \left| HTx(to - T)d^{(k)} + \sum_{j=0}^{N-1} HTx(to + J)cj \right|^2$$

wherein the reception channel further comprises a decoder inserted downstream of the receive filter, the decoder including means for restoring the modulated signal from the received filtered signal by restoring the suppressed numeric sequences having a high peak power in terms of peak power of the filtered modulated signal.

12. A system according to claim 11, wherein the decoder is of "recurrent" type.

13. A system according to claim 11, wherein the encoder comprises at least a map and a multiplexer.

14. A system according to claim 13, wherein the map replaces said numeric sequences having a high peak power in terms of peak power of the filtered modulated signal with suitable numeric sequences having a lower peak power in terms of peak power of the filtered modulated signal.

* * * * *

UNITED STATES PATENT AND TRADEMARK OFFICE
CERTIFICATE OF CORRECTION

PATENT NO. : 5,493,587
DATED : February 20, 1996
INVENTOR(S) : Sandri et al.

It is certified that error appears in the above-indentified patent and that said Letters Patent is hereby corrected as shown below:

Column 5, line 1 (claim 1), replace "channel;" with
--channel:--

Column 5, line 12 (claim 1), replace "channel;" with
--channel:--

Column 5, line 17 (claim 1), replace "filtering;" with
--filtering:--

Column 5, line 53 (claim 4), replace "(to + J)" with
--(to + JT)--

Column 6, line 36 (claim 8), replace "(to + J)" with
--(to + JT)--

Column 7, line 10 (claim 9), replace "(to + J)" with
--(to + JT)--

UNITED STATES PATENT AND TRADEMARK OFFICE
CERTIFICATE OF CORRECTION

PATENT NO. : 5,493,587
DATED : February 20, 1996
INVENTOR(S) : Sandri, et al

It is certified that error appears in the above-indentified patent and that said Letters Patent is hereby corrected as shown below:

Column 8, line 24 (claim 11), replace (to + J)" with
--(to + JT)--

Signed and Sealed this

Twentieth Day of August, 1996

Attest:

BRUCE LEHMAN

Attesting Officer     Commissioner of Patents and Trademarks